US010449999B2

(12) United States Patent
Düring et al.

(10) Patent No.: US 10,449,999 B2
(45) Date of Patent: Oct. 22, 2019

(54) METHOD AND DEVICE FOR ADAPTING A STEERING WHEEL ANGLE OF A STEERING WHEEL AND A WHEEL STEERING ANGLE OF A WHEEL STEERING SYSTEM IN A MOTOR VEHICLE

(71) Applicant: VOLKSWAGEN AG, Wolfsburg (DE)

(72) Inventors: Michael Düring, Braunschweig (DE); Kai Franke, Stendal (DE); Daniel Töpfer, Braunschweig (DE); Omar El Mikati, Berlin (DE)

(73) Assignee: VOLKSWAGEN AG (DE)

( * ) Notice: Subject to any disclaimer, the term of this patent is extended or adjusted under 35 U.S.C. 154(b) by 286 days.

(21) Appl. No.: 15/381,151

(22) Filed: Dec. 16, 2016

(65) Prior Publication Data

US 2017/0174257 A1 Jun. 22, 2017

(30) Foreign Application Priority Data

Dec. 18, 2015 (DE) .................... 10 2015 225 888

(51) Int. Cl.
| | | |
|---|---|---|
| *B62D 1/16* | (2006.01) | |
| *B62D 6/00* | (2006.01) | |
| *B62D 15/02* | (2006.01) | |
| *G01C 21/36* | (2006.01) | |

(52) U.S. Cl.
CPC ............ *B62D 6/00* (2013.01); *B62D 15/021* (2013.01); *G01C 21/3667* (2013.01)

(58) Field of Classification Search
CPC ........ B62D 6/00; B62D 1/166; B62D 15/021; B62D 15/0285; G01C 21/3667
See application file for complete search history.

(56) References Cited

U.S. PATENT DOCUMENTS

| 5,511,629 A * | 4/1996 | Vogel ................. B62D 5/001 180/405 |
| 6,082,482 A * | 7/2000 | Kato ................... B62D 6/008 180/402 |
| 2004/0011586 A1 * | 1/2004 | Zhao .................. B62D 5/006 180/402 |

(Continued)

FOREIGN PATENT DOCUMENTS

| DE | 102007002266 A1 | 7/2008 |
| DE | 102012004502 A1 | 9/2013 |

(Continued)

OTHER PUBLICATIONS

Search Report for German Patent Application No. 10 2015 225 888.2; dated Jul. 18, 2016.

*Primary Examiner* — Stephen Holwerda
(74) *Attorney, Agent, or Firm* — Barnes & Thornburg LLP (57) ABSTRACT

A method for adapting an actual steering wheel angle of a steering wheel and an actual wheel steering angle of a wheel steering system in a motor vehicle after an automated driving maneuver has been executed. The method includes detecting the actual steering wheel angle by a steering wheel angle-detection device and the actual wheel steering angle by a wheel steering angle-detection device, adapting the actual steering wheel angle by a steering wheel-actuation device and/or the actual wheel steering angle by a wheel steering-actuation device based on a transfer strategy within a predefined transfer time. Also disclosed is an associated device.

18 Claims, 6 Drawing Sheets

(56) References Cited

U.S. PATENT DOCUMENTS

| | | | | |
|---|---|---|---|---|
| 2007/0282500 | A1* | 12/2007 | Kouchi | B62D 15/0285 701/41 |
| 2007/0288142 | A1* | 12/2007 | Maeda | B62D 1/286 701/41 |
| 2014/0200770 | A1* | 7/2014 | Bahena | B62D 6/10 701/41 |

FOREIGN PATENT DOCUMENTS

| | | |
|---|---|---|
| DE | 102012214208 A1 | 2/2014 |
| DE | 102013009252 A1 | 12/2014 |
| DE | 102013013867 A1 | 3/2015 |
| DE | 102014202387 A1 | 8/2015 |
| EP | 2862767 A2 | 4/2015 |

\* cited by examiner

METHOD AND DEVICE FOR ADAPTING A STEERING WHEEL ANGLE OF A STEERING WHEEL AND A WHEEL STEERING ANGLE OF A WHEEL STEERING SYSTEM IN A MOTOR VEHICLE

PRIORITY CLAIM

This patent application claims priority to German Patent Application No. 10 2015 225 888.2, filed 18 Dec. 2015, the disclosure of which is incorporated herein by reference in its entirety.

SUMMARY

Illustrative embodiments relate to a method and to a device for adapting a steering wheel angle of a steering wheel and a wheel steering angle of a wheel steering system in a motor vehicle after an automated driving maneuver has been executed.

BRIEF DESCRIPTION OF THE DRAWINGS

Disclosed embodiments will be explained in more detail below with reference to the figures, of which.

DETAILED DESCRIPTION

Modern motor vehicles have a multiplicity of assistance systems which assist the driver in driving the vehicle. In this context, increasing use is being made of partially automatic and fully automatic systems which permit semi-automatic or fully automatic control of the motor vehicle.

It is known to permit motor vehicles to drive on trajectories in an automated state using an assistance system. In addition it is known to cause safety functions to be carried out in an automated state by means of an assistance system. Such a safety function can be directed, for example, at keeping within a lane or at braking or moving away to avoid a collision. The assistance system automatically detects a hazardous situation and reacts correspondingly by partially or completely assuming the control of the motor vehicle.

When such an automated driving maneuver is executed, it is possible, in modern steering systems, that a steering wheel becomes decoupled from a wheel steering system, with the result that after the ending of the automated driving maneuver there is a difference between the steering wheel angle and the wheel steering angle, and it is necessary to re-couple the steering wheel angle to the wheel steering angle or to transfer the control back to the driver or to some other automated vehicle controller.

EP 2 862 767 A2 discloses a motor vehicle comprising at least one driver assistance system, wherein in a first operating mode of the driver assistance system the motor vehicle can be controlled by a driver, wherein the driver assistance system is designed to switch temporarily into a second operating mode if future exiting of the roadway, and/or exiting of the roadway which has taken place, is determined with a probability which exceeds a predefined minimum probability, by evaluating ego data relating to the motor vehicle and/or ambient data relating to the surroundings of the motor vehicle, in which second operating mode the motor vehicle is steered automatically by the driver assistance system without a possibility of intervention by the driver.

DE 10 2012 004 502 A1 discloses a method for automatically parking a motor vehicle which is equipped with an active parking steering assistance system and a superimposition steering device. The method comprises determining a current wheel angle or a current steering wheel angle of the motor vehicle, generating a dynamic angle specification by means of the parking steering assistance system, and transferring the dynamic angle specification as an input signal for a control device of the vehicle steering device and for a control device of the superimposition steering device, controlling the vehicle steering device in such a way that the wheel angle is changed in accordance with the dynamic angle specification, and controlling the superimposition steering device in such a way that a superimposition angle is generated by means of which the change which is actually brought about in the steering wheel angle by control of the vehicle steering device is at least partially compensated.

Disclosed embodiments provide an improved method and an improved device for re-coupling a steering wheel angle to a wheel steering angle.

A method for adapting an actual steering wheel angle of a steering wheel and an actual wheel steering angle of a wheel steering system in a motor vehicle after an automated driving maneuver has been executed is made available, comprising detecting the actual steering wheel angle by means of a steering wheel angle-detection device and the actual wheel steering angle by means of a wheel steering angle-detection device, adapting the actual steering wheel angle by means of a steering wheel-actuation device and/or the actual wheel steering angle by means of a wheel steering-actuation device on the basis of a transfer strategy within a predefined transfer time.

In addition, a device in a motor vehicle for adapting an actual steering wheel angle of a steering wheel and an actual wheel steering angle of a wheel steering system after an automated driving maneuver has been executed is provided, comprising: a steering wheel angle-detection device for detecting the actual steering wheel angle, a wheel steering angle-detection device for detecting the actual wheel steering angle, a steering wheel-actuation device for setting the actual steering wheel angle, a wheel steering-actuation device for setting an actual wheel steering angle, a controller, wherein the controller is designed to bring about, on the basis of a transfer strategy, adaptation of the actual steering wheel angle by means of the steering wheel-actuation device and/or of the actual wheel steering angle by means of the wheel steering-actuation device.

The essential concept of the disclosed embodiments is to bring about, after the execution of automated travel, for example, an avoidance maneuver executed to maintain the safety of the motor vehicle, re-coupling of an actual steering wheel angle to an actual wheel steering angle by adapting the actual steering wheel angle and/or the actual wheel steering angle. For this purpose, a transfer strategy is defined which describes complete adaptation and on the basis of which the adaptation is regulated from the start to the successful conclusion. Transfer strategies which are different depending on the situation can be selected. By means of the disclosed method and the device, it is possible to react in a flexible way to a respectively present situation.

In at least one disclosed embodiment there is provision that the transfer strategy comprises calculating a setpoint steering wheel angle as a function of the actual wheel steering angle by means of a controller, applying a torque to the steering wheel as a function of the setpoint steering wheel angle, of the actual steering wheel angle and of the predefined transfer time by means of the steering wheel-actuation device until the actual steering wheel angle corresponds to the setpoint steering wheel angle. By applying the torque to the steering wheel, the steering wheel is returned to a setting in which the steering wheel angle corresponds to the wheel steering angle. Correspond means here that the steering wheel angle is adjusted to a value which it would have assumed if the steering wheel and the wheel steering system had not been coupled during the automated driving maneuver. The torque which is applied to the steering wheel can be, for example, proportional here to a difference value between the setpoint steering wheel angle and the actual steering wheel angle. However, in principle, other regulating methods are also possible, for example, taking into account integral and/or differential components (e.g., as a PID controller).

In a further disclosed embodiment there is provision that the transfer strategy comprises calculating a setpoint wheel steering angle as a function of the actual steering wheel angle by means of a controller, applying a torque to the wheel steering system as a function of the setpoint wheel steering angle, of the actual wheel steering angle and of the predefined transfer time by means of the wheel steering-actuation device until the actual wheel steering angle corresponds to the setpoint wheel steering angle. By applying the torque to the wheel steering system, the wheels are returned to a setting in which the steering wheel angle corresponds to the wheel steering angle. Correspond means here that the wheel steering angle is adjusted to a value which it would have assumed if the steering wheel and the wheel steering system had not been coupled during the automated driving maneuver. The torque which is applied to the wheels can be, for example, proportional here to a difference value between the setpoint wheel steering angle and the actual wheel steering angle. However, in principle, other regulating methods are also possible, for example, taking into account integral and/or differential components (e.g., PID controller).

In a further disclosed embodiment there is provision that the transfer strategy comprises calculating a setpoint steering wheel angle as a function of the actual wheel steering angle by means of a controller, calculating a setpoint steering wheel angle as a function of the actual steering wheel angle by means of the controller, applying a torque to the steering wheel as a function of the setpoint steering wheel angle, of the actual steering wheel angle and of the predefined transfer time by means of the steering wheel-actuation device, applying a torque to the wheel steering system as a function of the setpoint wheel steering angle, of the actual wheel steering angle and of the predefined transfer time by means of the wheel steering-actuation device. These transfer strategies constitute a combination of the two previous transfer strategies. By applying the torque both to the wheel steering system and to the steering wheel the wheels and the steering wheel are returned to settings in which the steering wheel angle corresponds to the wheel steering angle. Correspond means here again that the steering wheel angle and the wheel steering angle are adjusted to a value which they would have assumed if the steering wheel and the wheel steering system had not been coupled during the automated driving maneuver. In this context, the steering wheel angle and the wheel steering angle can coincide at the center of an initial difference or else at any other point between initial settings. The torque which is respectively applied to the wheels and to the steering wheel can be proportional here to a difference value between the setpoint steering wheel angle or setpoint wheel steering angle and the actual steering wheel angle or the actual wheel steering angle. However, in principle, other regulating methods are also possible, for example, taking into account integral and/or differential components (e.g., PID controller).

There is provision in at least one disclosed embodiment that the controller selects the transfer strategy by means of a selection criterion. The transfer strategy is not fixed from the outset but rather can be adapted in a flexible way. It is therefore possible always to react adequately to a present situation.

In at least one disclosed embodiment there is provision here that a traffic state is detected by means of a traffic state-detection device, and the selection criterion is defined by the controller alternatively or additionally on the basis of the detected traffic state. For example, the traffic state can comprise a traffic density, a traffic flow, a speed of the motor vehicle in question and speeds of other motor vehicles, a type of road, a road state etc. Depending on the presence of a predetermined traffic state, a transfer strategy which is assigned to this traffic state can be selected and executed. If, for example, dense traffic is present on a freeway but freely flowing traffic is present, after an automated driving maneuver the transfer strategy in which the steering wheel angle is approximated to the wheel steering angle is carried out. If the traffic situation is more relaxed, for example, on a country road with little traffic, after an automated driving maneuver the transfer strategy in which the wheel steering angle is approximated to the steering wheel angle is carried out.

In a further disclosed embodiment, there is additionally provision that a driver state is detected by means of a driver state-detection device, and the selection criterion is defined by the controller alternatively or additionally on the basis of the detected driver state. This permits a flexible selection of the transfer strategy as a function of the detected driver state. If a driver is inattentive, excessively tired or distracted, for example, before, during and/or after the automated driving maneuver, this is taken into account in the selection of the transfer strategy. For example, in this situation the transfer strategy in which only the steering wheel angle is adapted to the wheel steering angle is selected. If, on the other hand, the driver is relaxed and attentive, for example, the transfer strategy in which the wheel steering angle is adapted to the steering wheel angle is selected. The driver is then attentive enough to follow the adaptation and also include it in the planning of a future journey.

In addition, in at least one disclosed embodiment there is provision that the selection criterion is defined by the controller alternatively or additionally on the basis of the automated driving maneuver which is executed. In this context, essentially the type of the automated driving maneuver is decisive. If the automated driving maneuver has been carried out, for example, to avoid a collision with another oncoming motor vehicle, the transfer strategy is to be selected differently than if merely a changed course of a lane has been followed as a result of road works which are difficult to see. A corresponding transfer strategy is therefore selected and executed in accordance with the type of automated driving maneuver.

In a further disclosed embodiment there is provision that map data are made available by a navigation device, and the selection criterion is defined by the controller alternatively or additionally on the basis of the map data which is made available. This permits a predictive selection of the transfer strategy by also taking into account a future route and roads or tracks which will be traveled on in the future.

In at least one disclosed embodiment there is provision that the predefined transfer time is defined by the controller on the basis of a detected traffic state and/or a detected driver state and/or the automated driving maneuver which has been executed and/or map data which has been made available. The time which is required to carry out the transfer strategy can be adapted in a flexible way. Therefore, in the case of a short automated driving maneuver a short transfer time can be selected, since the total time of the automated driving maneuver and the transfer is short. In contrast, in the case of a longer lasting automated driving maneuver a relatively long transfer time is selected so that the driver of the motor vehicle has sufficient time to perceive and process the transfer.

In addition it is also possible that the transfer strategy is permanently predefined. In this way, allowance can be made for an individual preference of the driver. The driver can then permanently select a transfer strategy, for example, that transfer strategy which the driver feels is the most comfortable or the least disruptive.

The disclosed method and device can be used for re-coupling a steering wheel to a wheel steering system after a regular, automated journey. The term regular is intended to mean here that it does not involve an intervention in a manually controlled journey or another automated journey, for example, for preventing a collision. If the steering wheel is then uncoupled or blocked, for example, during a regular automated journey, the steering wheel must be coupled to the wheel steering system again before the regular automated journey ends, so that a driver is informed about a wheel steering angle and can assume the manual control over the motor vehicle.

Parts of the device can be embodied individually or together as a combination of hardware and software, for example, as a program code which is run on a microcontroller or microprocessor.

Figure 1:
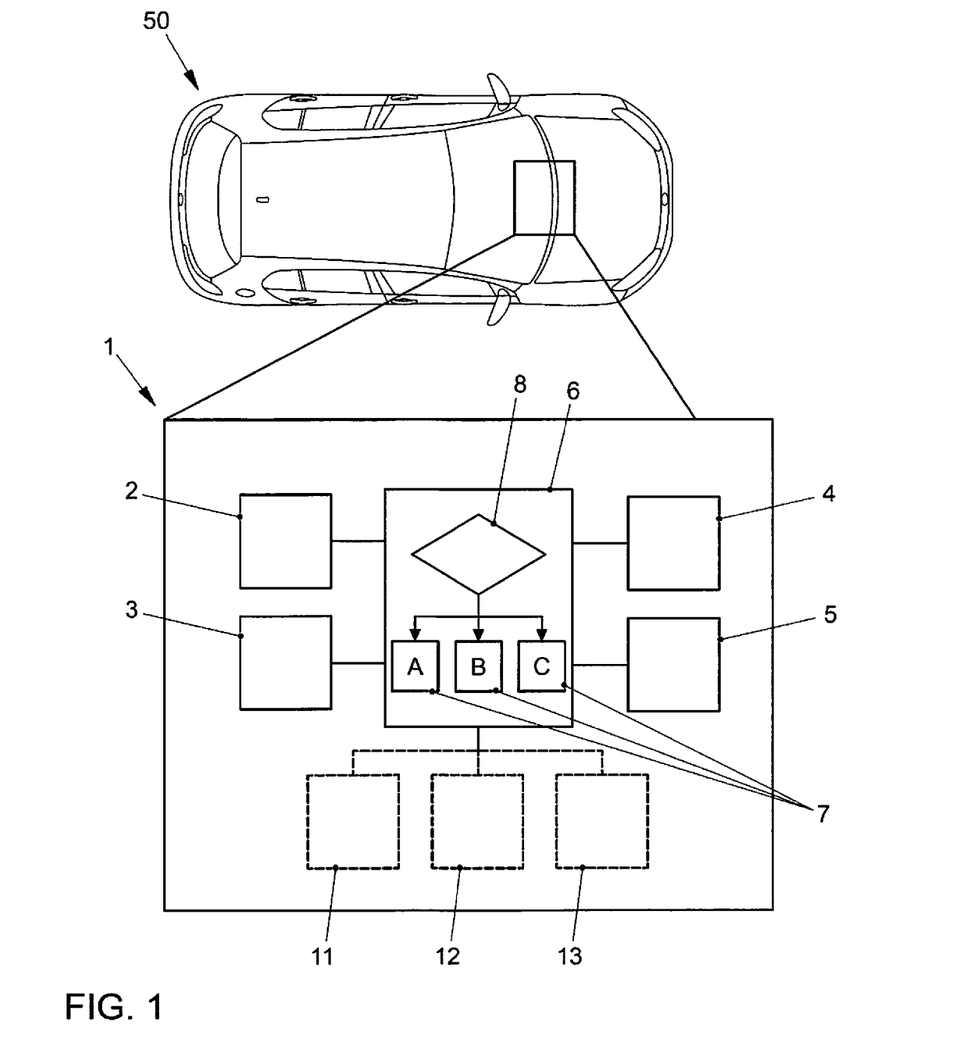
FIG. 1 shows a schematic illustration of an embodiment of the device for adapting a steering wheel angle of a steering wheel and a wheel steering angle of a wheel steering system in a motor vehicle after an automated driving maneuver has been executed.

FIG. 1 shows a schematic illustration of a disclosed embodiment of a device 1 for adapting a steering wheel angle of a steering wheel and a wheel steering angle of a wheel steering system in a motor vehicle 50 after an automated driving maneuver has been executed. The device 1 comprises a steering wheel angle-detection device 2, a wheel steering angle-detection device 3, a steering wheel-actuation device 4, a wheel steering-actuation device 5 and a controller 6.

It will be assumed as an initial situation that an automated driving maneuver has been executed and an actual steering wheel angle and an actual wheel steering angle of the motor vehicle 50 no longer correspond to one another after the end of the automated driving maneuver taking into account a present transmission ratio. The steering wheel angle-detection device 2 continuously detects the actual steering wheel angle, and the wheel steering angle-detection device 3 continuously detects the actual wheel steering angle. The detected values for the actual steering wheel angle and the actual wheel steering angle are passed onto the controller 6. The controller 6 checks a selection criterion 8, for example, the presence of a specific traffic state, the presence of a specific driver state and/or the presence of a specific automated driving maneuver, and can also additionally take into account information such as, for example, a roadmap of the surroundings of the motor vehicle 50, and selects a transfer strategy 7. If the transfer strategy 7 is selected, the controller 6 calculates a setpoint steering wheel angle or a setpoint wheel steering angle. The transfer strategy 7 is then carried out by the controller 6. For this purpose, the controller 6 controls the steering wheel-actuation device 4 and the wheel steering-actuation device 5. Depending on the selected transfer strategy 7, the actual steering wheel angle and/or the actual wheel steering angle are changed by applying a corresponding torque until the actual steering wheel angle and/or the actual wheel steering angle correspond to a setpoint steering wheel angle and/or a setpoint wheel steering angle. The torque is brought about by the steering wheel-actuation device 4 and the wheel steering-actuation device 5, respectively. If the respective actual angle and the setpoint angle correspond again, the adaptation method is ended and the steering wheel angle and the wheel steering angle are coupled to one another again. In the case of a future journey, the steering wheel and the wheel steering system move together again from then on, under certain circumstances in relation to a predefined transmission ratio.

The device 1 can additionally also have a traffic state-detection device 11 for detecting a traffic state, a driver state-detection device 12 for detecting a driver state and/or a navigation device 13 for making available map data and other information on the surroundings of the motor vehicle 50. A detected traffic state, detected driver state and/or the map data and other information can then also be correspondingly included in the selection of the transfer strategy 7.

Figure 2A:
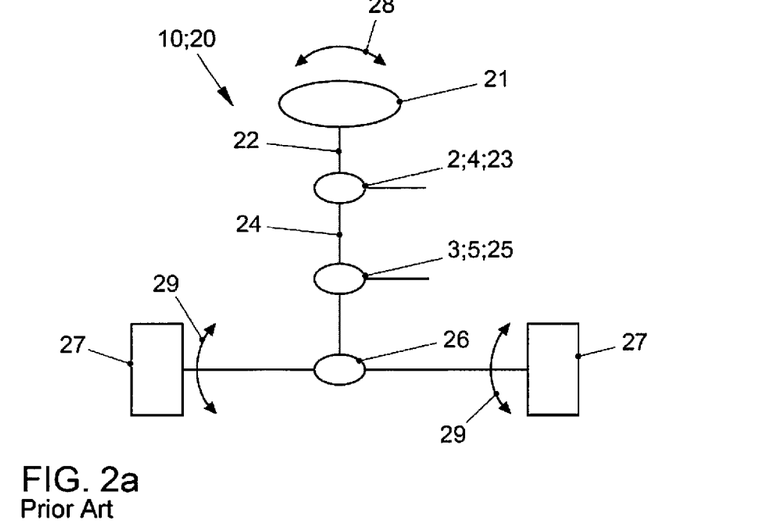
FIG. 2a shows a schematic illustration of a steering system, embodied as a superimposition system, in a motor vehicle (prior art)

FIG. 2a shows a schematic illustration of a steering system 10, embodied as a superimposition system 20, in a motor vehicle from the prior art. In the case of the superimposition system 20, a steering wheel 21 of the motor vehicle is connected to a planetary gear mechanism 23 via a mechanical connection 22. The planetary gear mechanism 23 has a steering wheel-actuation device 4 and a steering wheel angle-detection device 2. The planetary gear mechanism 23 is connected to a further planetary gear mechanism 25 via a further mechanical connection 24. The further planetary gear mechanism 25 has a wheel steering-actuation device 5 and a wheel steering angle-detection device 3. The further planetary gear mechanism 25 is connected to the wheels 27 via a wheel steering system 26. The planetary gear mechanisms 23, 25 permit an actual steering wheel angle 28 to be decoupled from an actual wheel steering angle 29, and a transmission ratio between the angles to be selected in a virtually arbitrary state by adding or subtracting torques. This results in a situation in which, for example, after automated travel in which the actual wheel steering angle 29 is controlled in an automated state while the actual steering wheel angle 28 remains unchanged, a difference arises between the actual steering wheel angle 28 and the actual wheel steering angle 29 which has to be eliminated again later.

Figure 2B:
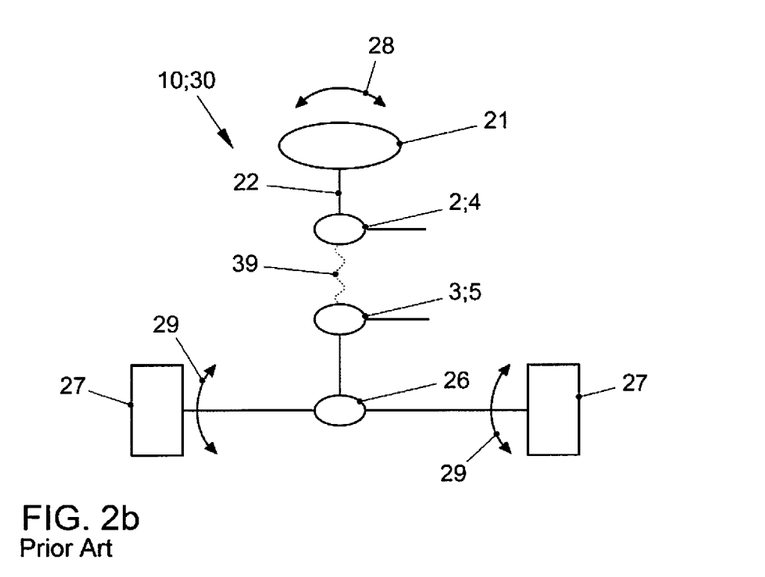
FIG. 2b shows a schematic illustration of a steering system, embodied as a steer-by-wire system, in a motor vehicle (prior art)

FIG. 2b shows a schematic illustration of a steering system 10, embodied as a steer-by-wire system 30, in a motor vehicle from the prior art. In contrast to the superimposition system 20, in which there is still a mechanical connection between the steering wheel 21 and the wheel steering system 26, the steering wheel 21 and the wheel steering system 26 are completely decoupled mechanically in the case of the steer-by-wire system 30. For this purpose, the steering wheel 21 is connected via a mechanical connection 22 to a steering wheel-actuation device 4 and a steering wheel angle-detection device 2. In addition, the steer-by-wire system 30 has a wheel steering-actuation device 5 and a wheel steering angle-detection device 3 which are connected to the wheel steering system 26 via a further mechanical connection 24. The steering wheel-actuation device 4 and the steering wheel angle-detection device 2 are only connected via a logic connection 39 to the wheel steering-actuation device 5 and the wheel steering angle-detection device 3. The steering wheel angle-detection device 2 detects a change in the actual steering wheel angle 28 at the steering wheel 21 which is brought about by a driver and instructs the wheel steering-actuation device 5 (logically) to change the actual wheel steering angle 29 in accordance with a predefined transmission ratio by applying a torque via the wheel steering system 26. Conversely, a change in the actual wheel steering angle 29 is detected by the wheel steering angle-detection device 3 and passed on (logically) to the steering wheel-actuation device 4. The steering wheel-actuation device 4 then changes the actual steering wheel angle 28 by applying a corresponding torque. Therefore, coupling occurs in both directions. However, during or after the execution of an automated driving maneuver, for example, for avoiding a collision, the actual steering wheel angle 28 and the actual wheel steering angle 29 may diverge, for example, if the steering wheel 21 points to the left but the wheels 27 are locked to the right. Before re-coupling, it is then necessary to approximate the two angles 28, 29.

Figure 3A:
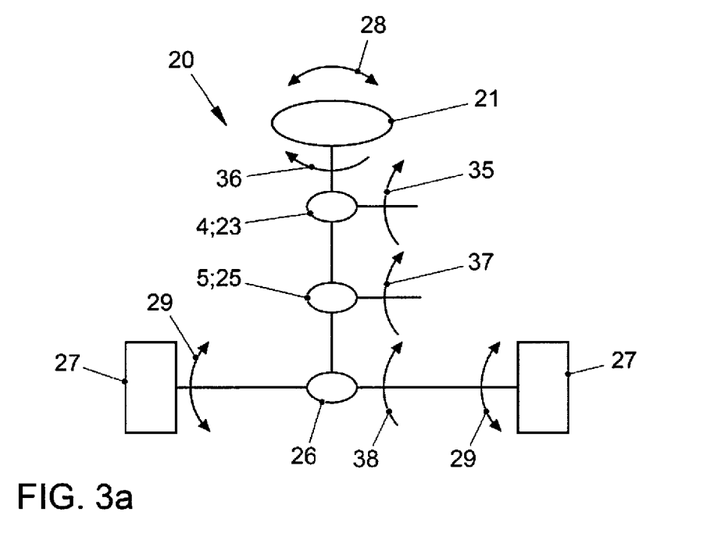
FIG. 3a shows a schematic illustration of a disclosed method for adapting a steering wheel angle of a steering wheel and a wheel steering angle of a wheel steering system in a motor vehicle after an automated driving maneuver has been executed, in a superimposition steering system.

FIG. 3a shows a schematic illustration of an initial situation for a disclosed method for adapting the actual steering wheel angle 28 of the steering wheel 21 and the actual wheel steering angle 29 of the wheel steering system 26 in a motor vehicle after an automated driving maneuver has been executed in a superimposition steering system 20. In the text which follows, differentiation is made between four different torques 35, 36, 37, 38: by applying an actuation torque 35 (Tactuat1) to the planetary gear mechanism 23 the steering wheel-actuation device 4 can apply a steering wheel torque 36 (Tsteerwheel) to the steering wheel 21. By applying a further actuation torque 37 (Tactuat2) via the further planetary gear mechanism 25 and the wheel steering system 26, the wheel steering-actuation device 5 can additionally apply a wheel steering torque 38 (TWheel).

If TActuat1=TActuat2=∞, no coupling is present between the steering wheel 21 and the wheels 27. The steering wheel torque 36 passes directly to the wheels 27 and onto the road, and the wheel steering torque 38 of the wheels 27 passes directly to the driver.

So that an avoidance function can force the motor vehicle onto a trajectory by means of automated travel and can decouple the driver in the process, the following must apply:

$T_{wheel} = T_{FunctionSpec}$, where $T_{FunctionSpec}$ is a torque which provides the avoidance function for the avoidance movement for the wheels 27, that is to say the avoidance function forces the motor vehicle onto the trajectory. There are two possible ways of decoupling the steering wheel 21 from the wheels 27. Firstly, the steering wheel 21 can be completely freely moving, that is to say the driver is not at all aware of the avoidance maneuver. The following must then apply:

$T_{Steerwheel} = 0$.

Secondly, the steering wheel 21 can also be blocked, and then the following must apply:

$T_{steerwheel} = \infty$.

Figure 3B:
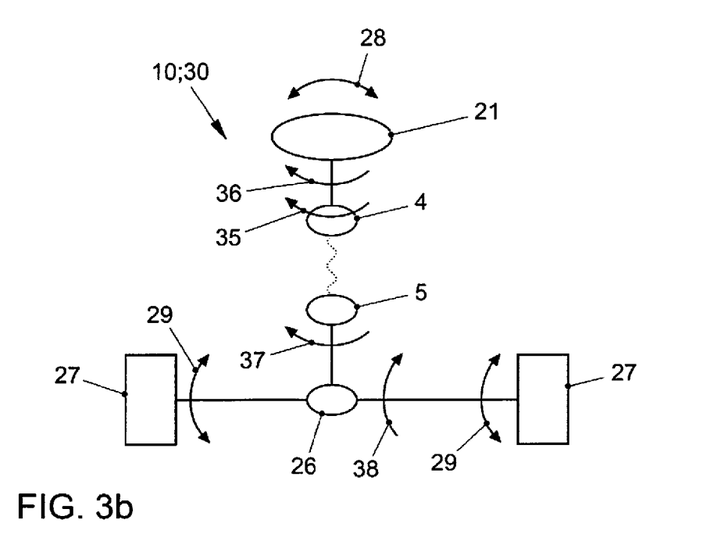
FIG. 3b shows a schematic illustration of a disclosed method for adapting a steering wheel angle of a steering wheel and a wheel steering angle of a wheel steering system in a motor vehicle after an automated driving maneuver has been executed, in a steer-by-wire system.

FIG. 3b shows a schematic illustration of an initial situation for a disclosed method for adapting the actual steering wheel angle 28 of the steering wheel 21 and the actual wheel steering angle 29 of the wheel steering system 26 in a motor vehicle after an automated driving maneuver has been executed, in a steer-by-wire system 30. In principle, the same four torques 35, 36, 37, 38 occur as in the superimposition system: the steering wheel-actuation device 4 can apply to the steering wheel 21 a steering wheel torque 36 (TSteerwheel) to the steering wheel 21 by applying an actuation torque 35 (TActuat1). In addition, the wheel steering-actuation device 5 can apply a wheel steering torque 38 (TWheel) by applying a further actuation torque 37 (TActuat2) via the wheel steering system 26.

If TActuat1=TWheel and TActuat2=TSteerwheel there is no steering assistance and the torque which is applied by a driver via the steering wheel 21 passes directly to the wheels 27 and therefore to the road. Conversely, a torque of the wheels 27 passes directly to the driver via the steering wheel 21.

So that an avoidance function can force the motor vehicle onto a trajectory by means of automated travel and can decouple the driver in the process, the following must as apply for the superimposition system:

$T_{Wheel} = T_{Functionspec}$, where $T_{Functionspec}$ is a torque which provides the avoidance function for the avoidance movement for the wheels 27, that is to say the function for the avoidance movement forces the motor vehicle onto the trajectory. There are again two possible ways of decoupling the steering wheel 21 from the wheels 27. Firstly, the steering wheel 21 can be completely free moving, that is to say the driver is not at all aware of the avoidance maneuver. The following must then apply:

$T_{Steerwheel} = 0$.

Secondly, the steering wheel 21 can also be blocked, and the following must then apply:

$$T_{Steerwheel} = \infty.$$

Figure 4A:
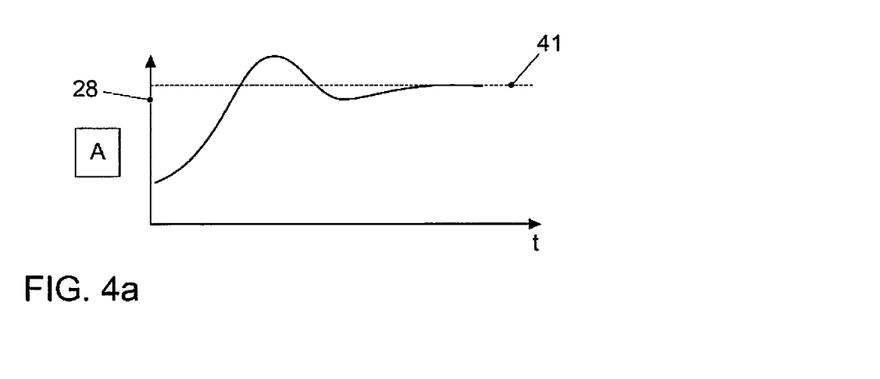
FIG. 4a shows a schematic time profile of adaptation of an actual steering wheel angle to a setpoint steering wheel angle by carrying out the disclosed method with a transfer strategy A.

FIG. 4a shows a schematic time profile of adaptation of an actual steering wheel angle 28 (SAact) to a setpoint steering wheel angle 41 (SAsetp) by carrying out the disclosed method with a transfer strategy which is characterized here by the Roman letter "A". The initial situation is the situation described in FIGS. 3a and 3b after the execution of automated travel, wherein the steering wheel has been decoupled or blocked, with the result that adaptation of the steering wheel and of the wheel steering angle is necessary.

In a first operation, a controller calculates the setpoint steering wheel angle 41. In the simplest case, the setpoint steering wheel angle 41 is, for example, the steering wheel angle which the steering wheel would have without decoupling from the actual wheel steering angle of the wheel steering system.

To adapt the actual steering wheel angle 28 (SAact) to the setpoint steering wheel angle 41 (SAsetp), during the transfer strategy A a steering wheel torque (TSteerwheel) is applied to the steering wheel, for example, according to the following function:

$$T_{Steerwheel} = k*(SA_{act} - SA_{setp})/t_{Rem},$$

where k is controller boosting and $t_{Rem}$ is the remaining time until complete adaptation of the actual steering wheel angle 28 to the setpoint steering wheel angle 41. FIG. 4a shows here the typical profile during the "adjustment" of the actual steering wheel angle 28 to the setpoint steering wheel angle 41. In contrast, no torque is applied to the wheels. If the remaining time $t_{Rem}$ has expired, the actual steering wheel angle 28 corresponds to the setpoint steering wheel angle 41 and the adaptation method is ended. The steering wheel is again coupled to the wheels via the wheel steering system. A driver or some other automatic system can then assume the steering again directly.

Figure 4B:
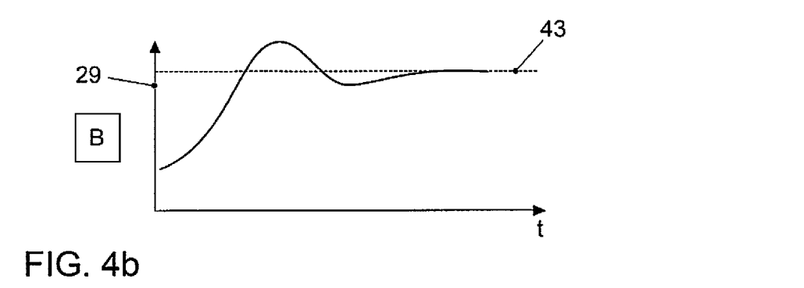
FIG. 4b shows a schematic time profile of adaptation of an actual wheel steering angle to a setpoint wheel steering angle by carrying out the disclosed method with a transfer strategy B.

FIG. 4b shows a schematic time profile of adaptation of an actual wheel steering angle 29 (WSAact) to a setpoint wheel steering angle 43 (WSAsetp) by carrying out the disclosed method with a transfer strategy which is characterized here by the Roman letter "B". The initial situation is the situation described in FIGS. 3a and 3b after the execution of automated travel, wherein the steering wheel has been decoupled or blocked, with the result that adaptation of the steering wheel angle and of the wheel steering angle is necessary.

In the first operation, the controller again calculates the setpoint wheel steering angle 43. In the simplest case, the setpoint wheel steering angle 43 is, for example, the wheel steering angle which the wheel steering system would have without decoupling from the actual steering wheel angle of the steering wheel.

To adapt the actual wheel steering angle 29 (SAact) to the setpoint wheel steering angle 43 (WSAsetp), a wheel torque (TWheel) is applied to the wheel steering system or the wheels in the transfer strategy B, for example, according to the following function:

$$T_{wheel} = k*(WSA_{act} - WSA_{setp})/t_{Rem},$$

where k is controller boosting and $t_{Rem}$ is the remaining time until complete adaptation of the actual wheel steering angle 29 to the setpoint wheel steering angle 43. FIG. 4b shows the typical profile during the "adjustment" of the actual wheel steering angle 29 to the setpoint wheel steering angle 43. In contrast, no torque is applied to the steering wheel. If the remaining time $t_{Rem}$ has expired, the actual wheel steering angle 29 corresponds to the setpoint wheel steering angle 43 and the adaptation method is ended. The steering wheel is then coupled again to the wheels via the wheel steering system. A driver or some other automatic system can then assume the steering again directly.

Figure 4C:
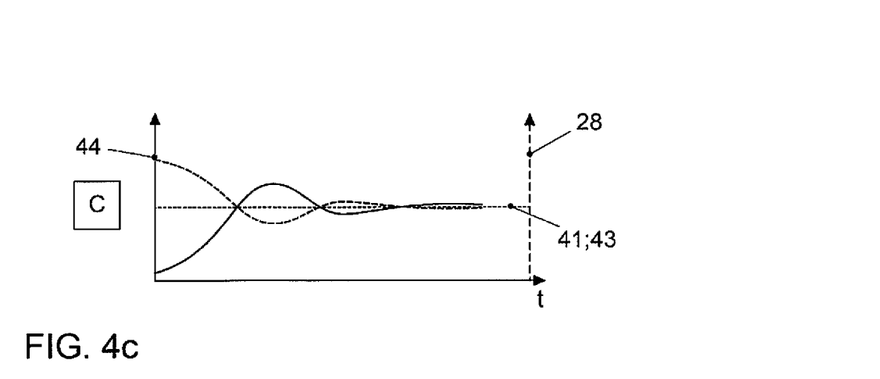
FIG. 4c shows a schematic time profile of adaptation of an actual steering wheel angle to a setpoint steering wheel angle and of an actual wheel steering angle to a setpoint wheel steering angle by carrying out the disclosed method with a transfer strategy C.

FIG. 4c shows a schematic time profile of simultaneous adaption both of an actual steering wheel angle 28 (SAact) to a setpoint steering wheel angle 41 (SAsetp) as well as of an actual wheel steering angle 29 (WSAact) to a setpoint wheel steering angle 43 (WSAsetp) by carrying out the disclosed method with a transfer strategy which is characterized here by the Roman letter "C". The initial situation is the situation described in FIGS. 3a and 3b after the execution of automated travel, wherein the steering wheel has been decoupled or blocked, with the result that adaptation of the steering wheel angle and the wheel steering angle is necessary.

In a first operation, the controller calculates both the setpoint steering wheel angle 41 and the setpoint wheel steering angle 43. In this context, the setpoint wheel steering angle 41 lies between the actual steering wheel angle 28 and the steering wheel angle which the steering wheel would have without decoupling from the wheel steering system. The setpoint wheel steering angle 43 lies between the actual wheel steering angle 29 and the wheel steering angle which the wheel steering system would have without decoupling from the steering wheel. In the simplest case, the setpoint steering wheel angle 41 is calculated, for example, as an arithmetic mean value between the actual steering wheel angle 28 and the steering wheel angle which the steering wheel would have without decoupling or blocking. In an analogous state to this, the setpoint wheel steering angle 43 is then calculated as an arithmetic mean value between the actual wheel steering angle 29 and the wheel steering angle which the wheel steering system would have without decoupling or blocking with respect to an actual steering wheel angle 28 of the steering wheel.

It is also possible that the arithmetic mean values are not selected as the setpoint values but instead values at which adaptation is distributed in accordance with a predetermined ratio between the steering wheel and the wheel steering system (e.g., ⅓ at the steering wheel and ⅔ at the wheel steering system etc.).

To adapt the actual steering wheel angle 28 (SAact) to the setpoint steering wheel angle 41 (SAsetp), in the transfer strategy C a steering wheel torque (Tsteerwheel) is applied to the steering wheel, for example, according to the following function:

$$T_{Steerwheel} = k_1*(SA_{act} - g*SA_{setp})/t_{Rem},$$

where $k_1$ is controller boosting, g is a conversion factor of a transmission ratio, for example, a planetary gear mechanism in a superimposition system and $t_{Rem}$ is the remaining time until complete adaptation of the actual steering wheel angle 28 to the setpoint steering wheel angle 41.

To adapt the actual wheel steering angle 28 (SAact) simultaneously to the setpoint wheel steering angle 43 (WSAsetp), in the transfer strategy C a wheel torque (Twheel) is applied to the wheel steering system or the wheels, for example, according to the following function:

$$T_{wheel} = k_2*(g*WSA_{act} - WSA_{setp})/t_{Rem},$$

where $k_2$ is corresponding controller boosting, g is the conversion factor of the transmission ratio and $t_{Rem}$ is the remaining time until complete adaptation of the actual wheel steering angle 29 to the setpoint wheel steering angle 43.

FIG. 4c shows here the typical profile during the "adjustment" of the actual steering wheel angle 41 to the setpoint steering wheel angle 43 and of the actual wheel steering angle 29 to the setpoint wheel steering angle 43, wherein the actual wheel steering angle 29 is illustrated multiplied by the conversion factor g as an adapted actual wheel steering angle 44. Corresponding torque is applied both to the steering wheel and to the wheel steering system. If the remaining time tRem has expired, the actual steering wheel angle 41 corresponds to the setpoint steering wheel angle 41, and the actual wheel steering angle 29 corresponds to the setpoint wheel steering angle 43, and the adaptation method is ended. The steering wheel is then coupled again to the wheels via the wheel steering system. A driver or some other automatic system can then assume the steering again directly.

The functions described here by way of example for calculating the torques for the transfer strategies A, B and C can also be structured differently.

Figure 5:
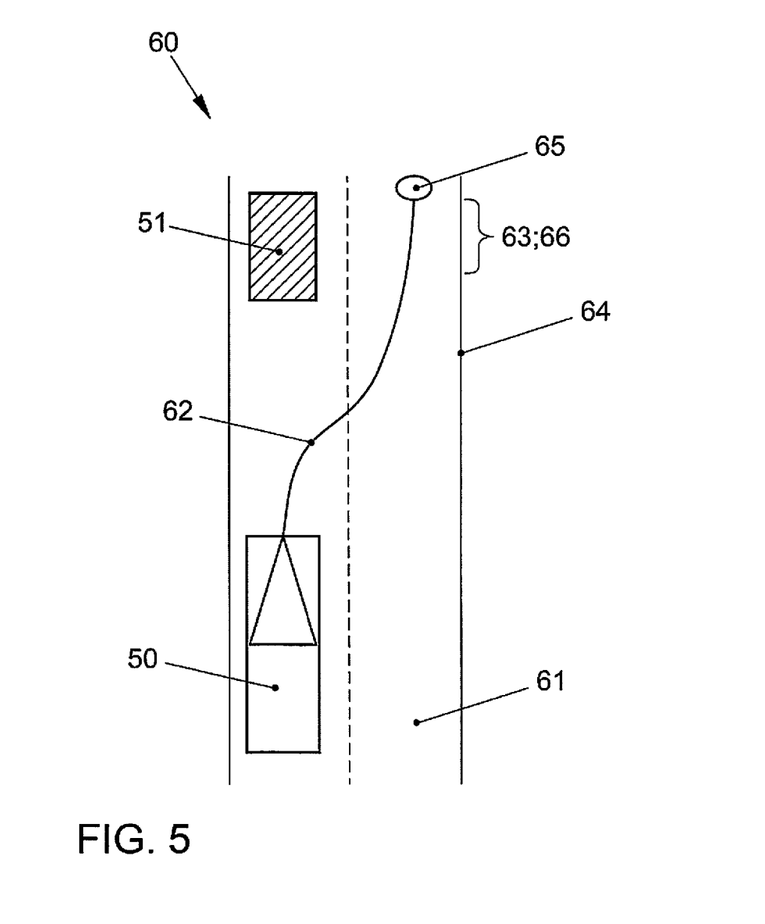
FIG. 5 shows a schematic illustration of a typical traffic situation for the purpose of explaining the method.

FIG. 5 illustrates a typical traffic situation 60 for the purpose of explaining the disclosed method. A motor vehicle 50 is located on a road 61. The motor vehicle 50 is driven manually by a driver or in an automated state by an automatic system. An assistance system detects a possible collision with another oncoming motor vehicle 51. The assistance system guides the vehicle and triggers an avoidance maneuver 62, wherein the motor vehicle 50 changes lane to the right. After the avoidance maneuver 62 is ended and the assistance system has evaluated the traffic situation 60 again as a safe state 65, in a transfer region 63 a transfer of the guidance of the vehicle back to the driver or the automatic system takes place according to the disclosed method. A safe state 65 of the traffic situation 60 is then present, for example, if a distance of the motor vehicle 50 from the edge 64 of the roadway, a driving direction and/or a speed are categorized as safe. The transfer region 63 is determined, for example, by a predefined transfer time 66 before the end of the avoidance maneuver 62, wherein the transfer time 66 is, for example, 300 milliseconds. Within this transfer time 66, the adaptation of a steering wheel angle and of a wheel steering angle and a return of the guidance of the vehicle to the driver or the automatic system then take place.

Figure 6:
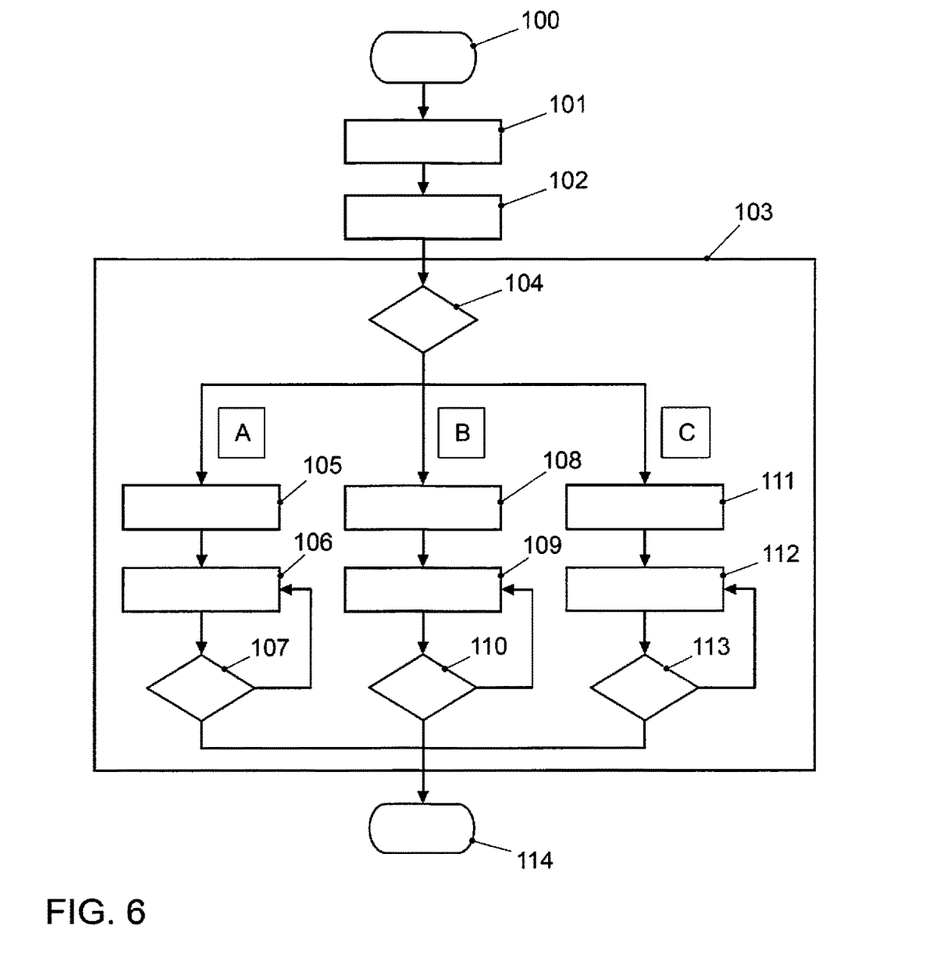
FIG. 6 shows a schematic flowchart of a method for adapting a steering wheel angle of a steering wheel and a wheel steering angle of a wheel steering system in a motor vehicle after an automated driving maneuver has been executed.

FIG. 6 shows a schematic flowchart of a method for adapting a steering wheel angle of a steering wheel and a wheel steering angle of a wheel steering system in a motor vehicle after an automated driving maneuver has been executed. Before the end of the driving maneuver which has been executed in an automated state, the method is started 100. In a first method operation at 101, an actual steering wheel angle is detected by a steering wheel angle-detection device. Subsequently, an actual wheel steering angle is detected 102 by a wheel steering angle-detection device. Subsequently, the steering wheel angle is adapted 103 by a steering wheel-actuation device, and the wheel steering angle is adapted 103 by a wheel steering-actuation device. For this purpose, a controller selects 104 a transfer strategy according to a selection criterion. This involves, for example, the three transfer strategies A, B and C already described.

If the transfer strategy A has been selected, firstly a setpoint steering wheel angle is calculated 105 by the controller. Subsequently, the actual steering wheel angle is changed 106 by the steering wheel-actuation device by applying a torque to the steering wheel. The controller checks here continuously whether the actual steering wheel angle corresponds 107 to the setpoint steering wheel angle. If this is not the case, a torque continues to be applied 106 to the steering wheel. If the actual steering wheel angle corresponds to the setpoint steering wheel angle, the method is ended 114.

If, on the other hand, transfer strategy B has been selected, firstly a setpoint wheel steering angle is calculated 108 by the controller. Subsequently, the actual wheel steering angle is changed 109 by the wheel angle-actuation device by applying a torque to the wheel steering system. The controller checks here continuously whether the actual wheel steering angle corresponds 110 to the setpoint wheel steering angle. If this is not the case, a torque continues to be applied 109 to the wheel steering system. If the actual wheel steering angle corresponds to the setpoint wheel steering angle, the method is ended 114.

If transfer strategy C has been selected, firstly a setpoint steering wheel angle and a setpoint wheel steering angle are calculated 111 by the controller. Subsequently, the actual steering wheel angle is changed 112 by the steering wheel-actuation device, and the actual wheel steering angle is changed 112 by the wheel steering-actuation device by respectively applying a torque to the steering wheel or to the wheel steering system. The controller checks here continuously whether the actual steering wheel angle and the actual wheel steering angle correspond 113 to the setpoint steering wheel angle or the setpoint wheel steering angle. If this is not the case, a torque continues to be applied 112 to the steering wheel or to the wheel steering system, respectively. If the actual steering wheel angle corresponds to the setpoint steering wheel angle, and the actual wheel steering angle corresponds to the setpoint wheel steering angle, the method is ended 114.

LIST OF REFERENCE NUMBERS

1 Device
2 Steering wheel angle-detection device
3 Wheel steering angle-detection device
4 Steering wheel-actuation device
5 Wheel steering-actuation device
6 Controller
7 Transfer strategy
9 Selection criterion
10 Steering system
11 Traffic state-detection device
12 Driver state-detection device
13 Navigation device
20 Superimposition system
21 Steering wheel
22 Mechanical connection
23 Planetary gear mechanism
24 Further mechanical connection
25 Planetary gear mechanism
26 Wheel steering system
27 Wheels
28 Actual steering wheel angle
29 Actual wheel steering angle
30 Steer-by-wire system
35 Actuation torque
36 Steering wheel torque
37 Further actuation torque
38 Wheel steering torque
39 Logic connection
41 Setpoint steering wheel angle
43 Setpoint wheel steering angle
44 Adapted actual wheel steering angle
50 Motor vehicle 51 Other motor vehicle
60 Traffic situation
61 Road
62 Avoidance maneuver
63 Transfer region
64 Edge of roadway
65 Safe state
66 Transfer time
100-114 Method operations

The invention claimed is:

1. A method for adapting an actual steering wheel angle of a steering wheel and an actual wheel steering angle of a wheel steering system in a motor vehicle after an automated driving maneuver has been executed that causes the steering wheel to be decoupled from the wheel steering system, the method comprising:
    detecting the actual steering wheel angle by a steering wheel angle-detection device and the actual wheel steering angle by a wheel steering angle-detection device after decoupling of the steering wheel from the wheel steering system resulting from the execution of the automated driving maneuver;
    adapting the actual steering wheel angle by a steering wheel-actuation device based on a transfer strategy and/or the actual wheel steering angle by a wheel steering-actuation device based on the transfer strategy within a predefined transfer time, wherein the actual steering wheel angle and/or the actual wheel steering angle are adapted to a setpoint steering wheel angle and a setpoint wheel steering angle corresponding to a steering wheel angle and a wheel steering angle present if the decoupling of the steering wheel and the wheel steering system had not occurred, or wherein the actual steering wheel angle and the actual wheel steering angle are adapted to a setpoint steering wheel angle and a setpoint wheel steering angle corresponding to a steering wheel angle and a wheel steering angle present if the decoupling of the steering wheel and the wheel steering system had not occurred, or wherein the actual steering wheel angle and the actual wheel steering angle are adapted to a setpoint steering wheel angle or a setpoint wheel steering angle corresponding to a steering wheel angle and a wheel steering angle present if the decoupling of the steering wheel and the wheel steering system had not occurred; and
    re-coupling the steering wheel and the wheel steering system and transferring guidance of the motor vehicle to an automated system or a driver by the end of the predefined transfer time.

2. The method of claim 1, wherein the steering wheel angle is adapted by the steering wheel actuation device and the transfer strategy comprises:
    calculating the setpoint steering wheel angle as a function of the actual wheel steering angle by a controller, and
    applying a torque to the steering wheel as a function of the setpoint steering wheel angle, of the actual steering wheel angle, and of the predefined transfer time by the steering wheel-actuation device until the actual steering wheel angle corresponds to the setpoint steering wheel angle.

3. The method of claim 1, wherein the actual wheel steering angle is adapted by the wheel steering actuation device and the transfer strategy comprises:
    calculating the setpoint wheel steering angle as a function of the actual steering wheel angle by a controller, and
    applying a torque to the wheel steering system as a function of the setpoint wheel steering angle, of the actual wheel steering angle, and of the predefined transfer time by the wheel steering-actuation device until the actual wheel steering angle corresponds to the setpoint wheel steering angle.

4. The method of claim 1, wherein the steering wheel angle is adapted by the steering wheel actuation device, the actual wheel steering angle is adapted by the wheel steering actuation device and the transfer strategy comprises:
    calculating the setpoint steering wheel angle as a function of the actual wheel steering angle by a controller,
    calculating the setpoint wheel steering angle as a function of the actual steering wheel angle by the controller,
    applying a torque to the steering wheel as a function of the setpoint steering wheel angle, of the actual steering wheel angle, and of the predefined transfer time by the steering wheel-actuation device, and
    applying a torque to the wheel steering system as a function of the setpoint wheel steering angle, of the actual wheel steering angle and of the predefined transfer time by the wheel steering-actuation device.

5. The method of claim 1, wherein the controller selects the transfer strategy by a selection criterion.

6. The method of claim 5, wherein a traffic state is detected by a traffic state-detection device, and the selection criterion is defined by the controller alternatively based on the detected traffic state or additionally based on the detected traffic state.

7. The method of claim 5, wherein a driver state is detected by a driver state-detection device, and the selection criterion is defined by the controller alternatively based on the detected driver state or additionally based on the detected driver state.

8. The method of claim 5, wherein the selection criterion is defined by the controller alternatively based on the automated driving maneuver which is executed or additionally based on the automated driving maneuver which is executed.

9. The method of claim 5, wherein map data are made available by a navigation device, and the selection criterion is defined by the controller alternatively based on the map data which is made available or additionally based on the map data which is made available.

10. A device in a motor vehicle for adapting an actual steering wheel angle of a steering wheel and an actual wheel steering angle of a wheel steering system after an automated driving maneuver has been executed that causes the steering wheel to be decoupled from the wheel steering system, the device comprising:
    a steering wheel angle-detection device for detecting the actual steering wheel angle;
    a wheel steering angle-detection device for detecting the actual wheel steering angle;
    a steering wheel-actuation device for setting the actual steering wheel angle;
    a wheel steering-actuation device for setting an actual wheel steering angle; and
    a controller;
    wherein the controller brings about, after decoupling of the steering wheel from the wheel steering system resulting from the execution of the automated driving maneuver, based on a transfer strategy, adaptation of the actual steering wheel angle by the steering wheel-actuation device and/or of the actual wheel steering angle by the wheel steering-actuation device within a predefined transfer time,
    wherein the controller adapts the actual steering wheel angle and/or the actual wheel steering angle to a setpoint steering wheel angle and/or a setpoint wheel steering angle corresponding to a steering wheel angle and a wheel steering angle present if the decoupling of the steering wheel and the wheel steering system had not occurred, or wherein the controller adapts the actual steering wheel angle and/or the actual wheel steering angle to a setpoint steering wheel angle and a setpoint wheel steering angle corresponding to a steering wheel angle and a wheel steering angle present if the decoupling of the steering wheel and the wheel steering system had not occurred, or wherein the controller adapts the actual steering wheel angle and the actual wheel steering angle to a setpoint steering wheel angle and a setpoint wheel steering angle corresponding to a steering wheel angle and a wheel steering angle present if the decoupling of the steering wheel and the wheel steering system had not occurred; and wherein the controller re-couples the steering wheel and the wheel steering system and transfers guidance of the motor vehicle to an automated system or a driver by the end of the predefined transfer time.

11. The device of claim 10, wherein the transfer strategy comprises:

calculating the setpoint steering wheel angle as a function of the actual wheel steering angle by the controller, and applying a torque to the steering wheel as a function of the setpoint steering wheel angle, of the actual steering wheel angle, and of the predefined transfer time by the steering wheel-actuation device until the actual steering wheel angle corresponds to the setpoint steering wheel angle.

12. The device of claim 10, wherein the transfer strategy comprises:

calculating the setpoint wheel steering angle as a function of the actual steering wheel angle by the controller, and applying a torque to the wheel steering system as a function of the setpoint wheel steering angle, of the actual wheel steering angle, and of the predefined transfer time by the wheel steering-actuation device until the actual wheel steering angle corresponds to the setpoint wheel steering angle.

13. The device of claim 10, wherein the transfer strategy comprises:

calculating the setpoint steering wheel angle as a function of the actual wheel steering angle by the controller, calculating the setpoint wheel steering angle as a function of the actual steering wheel angle by the controller, applying a torque to the steering wheel as a function of the setpoint steering wheel angle, of the actual steering wheel angle, and of the predefined transfer time by the steering wheel-actuation device, and applying a torque to the wheel steering system as a function of the setpoint wheel steering angle, of the actual wheel steering angle and of the predefined transfer time by the wheel steering-actuation device.

14. The device of claim 10, wherein the controller selects the transfer strategy by a selection criterion.

15. The device of claim 14, wherein a traffic state is detected by a traffic state-detection device, and the selection criterion is defined by the controller alternatively or additionally based on the detected traffic state.

16. The device of claim 14, wherein a driver state is detected by a driver state-detection device, and the selection criterion is defined by the controller alternatively or additionally based on the detected driver state.

17. The device of claim 14, wherein the selection criterion is defined by the controller alternatively or additionally based on the automated driving maneuver which is executed.

18. The device of claim 14, wherein map data are made available by a navigation device, and the selection criterion is defined by the controller alternatively or additionally based on the map data which is made available.

* * * * *